April 5, 1960 R. E. PRICE ET AL 2,931,144
DUAL PRESSURE WORK CARRIER FOR AUTOMATIC GRINDING MACHINES
Filed Nov. 1, 1956 3 Sheets-Sheet 1

R. E. Price and E. R. Klumm
INVENTORS

BY Mason, Porter, Miller & Stewart
ATTORNEYS

April 5, 1960 R. E. PRICE ET AL 2,931,144
DUAL PRESSURE WORK CARRIER FOR AUTOMATIC GRINDING MACHINES
Filed Nov. 1, 1956 3 Sheets-Sheet 2
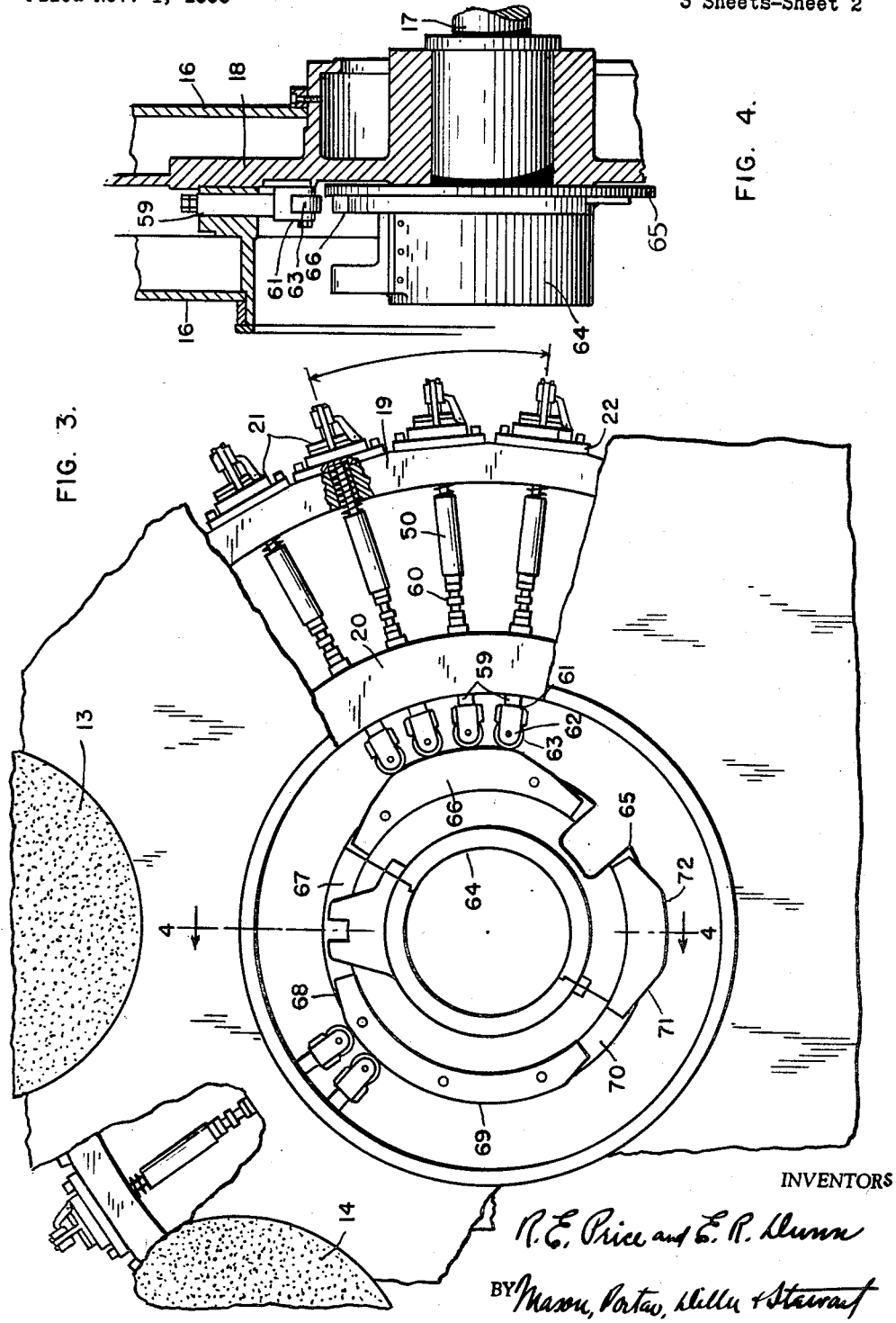
INVENTORS
R. E. Price and E. R. Dunn
BY Mason, Porter, Diller & Stewart
ATTORNEYS

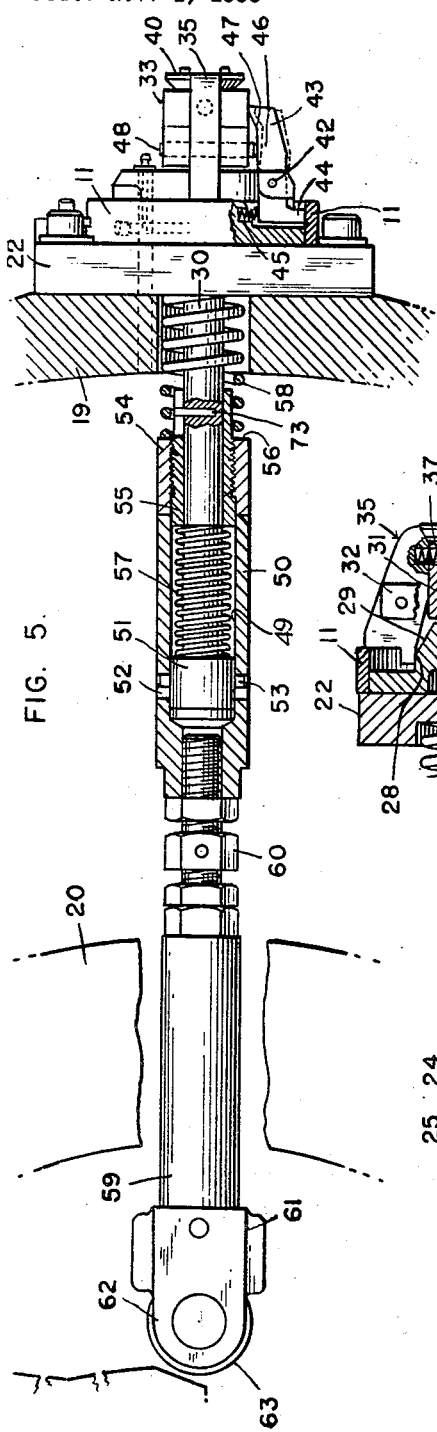
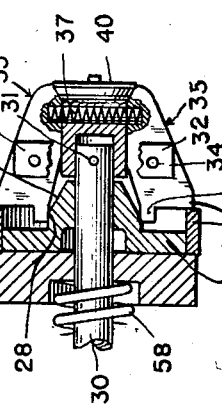
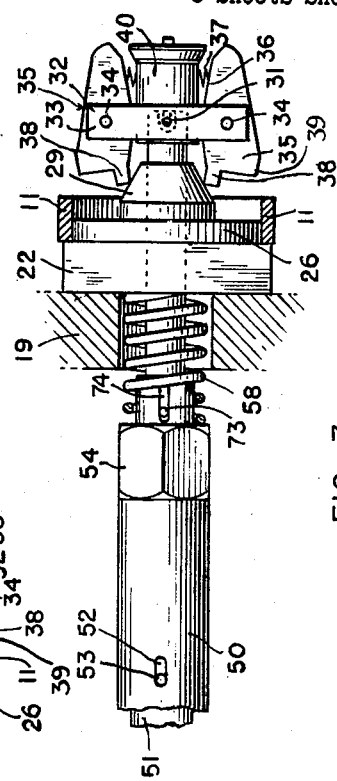
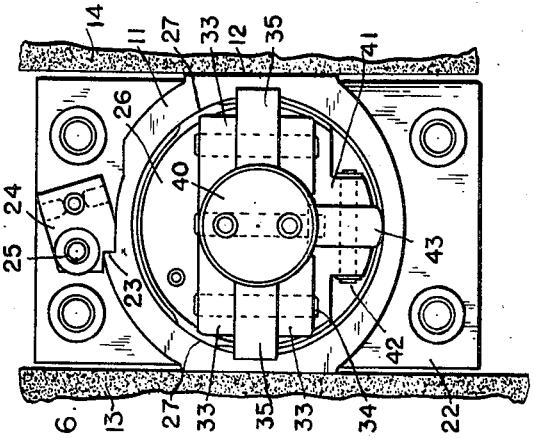

2,931,144
Patented Apr. 5, 1960

United States Patent Office

2,931,144

DUAL PRESSURE WORK CARRIER FOR AUTOMATIC GRINDING MACHINES

Ralph E. Price and Elman R. Dunn, Beloit, Wis., assignors to Gardner Machine Company, South Beloit, Ill., a corporation of Illinois Application November 1, 1956, Serial No. 619,802

10 Claims. (Cl. 51—118)

The invention of which the following is a detailed specification relates to a dual pressure work carrier for automatic grinding machines.

It is frequently necessary to grind work pieces of irregular shape in two stages, first a rough grinding and second a finished grinding operation. The present invention provides a holder for a work piece, carry it through two or more successive work grinding zones where the work piece is first rough ground and subsequently ground to the final or finish dimensions. In such an operation, the work piece should be held with considerable pressure during the roughing stage. However, stresses on work pieces should be relieved after this operation. The final grinding operation should take place when the work piece is held with less or moderate force thus avoiding the production of distorting stress.

The invention has been developed specifically for the above purposes where a work piece is to be ground on opposite parallel flat surfaces.

One of the objects of the invention is to hold work pieces firmly as they pass by two or more grinding stations where increasing degrees of fine grinding are carried out.

A further object of the invention is to vary the pressure by which the work pieces are held in the successive work positions.

A still further object of the invention is to relieve stresses in the work pieces resulting from the first grinding operation and before a succeeding grinding operation is carried out.

Among the objects of the invention is to position a work piece accordingly upon the carrier.

It is also an object of the invention to provide novel means for holding the work piece down upon the carrier.

An incidental object of the invention is to clamp the work piece in position with equalizing pressure upon the opposite sides of the piece.

A still further object of the invention is to provide resilient means by which the pressure applied for holding or clamping the work piece is imposed during the preliminary grinding step but diminished when the second or subsequent step is being carried out.

Other incidental objects of the invention will be apparent from the following description of the preferred form of my invention as illustrated on the drawings and in which:

Figure 3 is an enlarged elevation partly in section showing work carriers in two positions;

Figure 4 is an enlarged and elevation partly in section of the rotary shaft, cam and related parts;

Figure 5 is an enlarged side elevation partly in section of one work holder and related parts;

Figure 6 is an end elevation of one work holder unit;

Figure 7 is a detailed side elevation, partly in section, of the work holding means before its engagement with the work and Figure 8 is a similar view of the means after engagement with the work.

Figure 2:
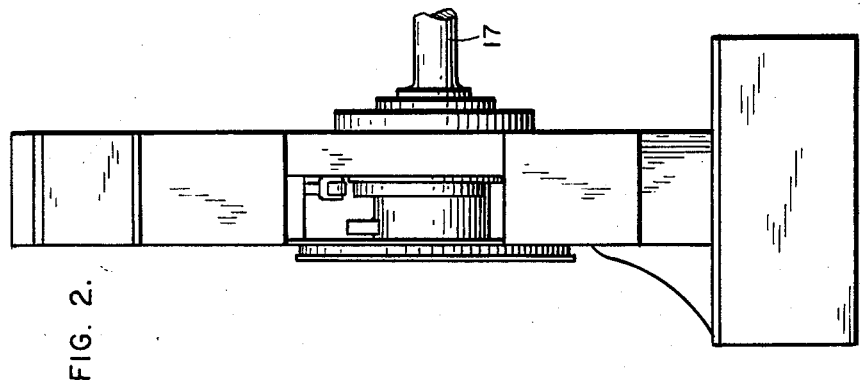
Figure 2 is an end view of the same.
Figure 1:
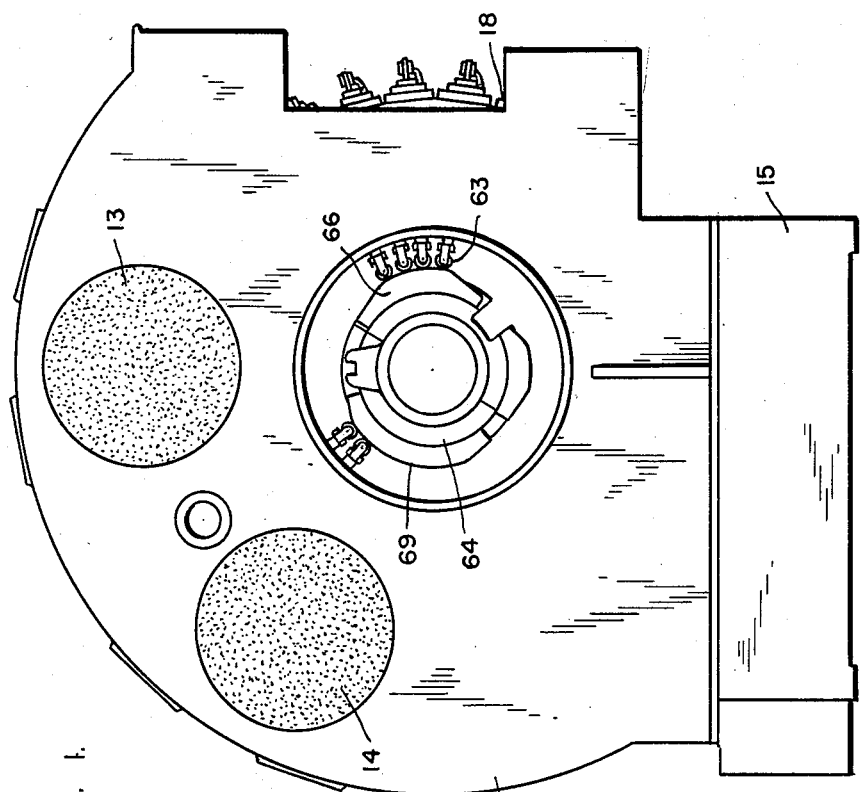
Figure 1 is a side elevational of a two-stage grinding machine equipped with the improved carrier.

Briefly considered, the novel machine consists of a rotary drum or carrier having a considerable number of individual fixtures or work holding units. On rotation of the carrier, these units are successively presented between pairs of opposed rotary grinding disks so that the opposite faces of the work will be ground in parallel planes. As the work passes through the first zone, the faces will be given a rough grinding cut. At subsequent work stations, the grinding operation will be progressively finer so that the work piece will be given a pair of parallel finished surfaces.

Each individual work holding unit is provided with facilities for holding a work piece, drawing it into the desired position, and then holding it by a clamp with pressure equalized between opposite sides.

The pressure applied upon the individual fixtures is first of a high order during the rough grinding. Following this, the pressure is diminished and replaced by a secondary source of pressure of lesser degree while the work piece passes through the second or subsequent fine grinding stage.

Finally, the pressure upon the clamping means is completely released, the finished article drops out and another work piece set up to be positioned, clamped and ground.

In Fig. 6 of the drawings, there has been illustrated a work piece 11. This consists of an irregular ring with flat parallel outer portions 12, 12 which it is intended will be ground in two stages. The grinding operation will be carried out between successive pairs of rotary disk grinders 13, 14.

A base 15 is provided with a housing 16. Centrally disposed within the housing is a rotary shaft 17 on which is provided a carrier 18. This carrier has an outer drum 19 and an inner concentric circular web 20.

Individual work holding units 21 are radially journalled in the drum 19 and the web 20.

The outer surface of the drum 19 carries a fixed fixture plate 22.

Referring to Figure 6, the work piece 11 will be found to have a notch 23 cut in its outer periphery. The fixture plate 22 carries a locator or stop 24 pivotally held at 25 and subject to adjustment radially of the fixture. In setting up the work piece 11, it is placed against the face of the fixture plate and rotated until the shoulder of the notch 23 rests against the edge of the locator 24.

A fixture body 26 is bolted upon the face of the fixture plate 22. The body 26 has a generally circular periphery with two bosses 27, 27 spaced approximately 120° apart. As indicated in Figure 6, the work piece 11 rests upon the opposite bosses 27, 27 in its final position. Means will be described later for drawing the work piece down on the bosses 27, 27 with the desired pressure.

Centrally of the fixture body 26 there is provided a cylindrical extension 28. This terminates in an upstanding cone 29. A central bushed bore extends through both the fixture plate and the fixture body.

A clamping bar 30 is slidably journalled in the bore of the cone 29. The outer end of the clamping bar 30 is provided with a pivot 31 which carries a yoke 32 in such manner that the latter may rock loosely on the pivot.

The yoke terminates laterally in two diametrically opposed bifurcated bearings 33, each carrying a pivot pin 34. A clamping arm 35 is pivotally carried in the bearings 33 on the pivot pins 34. Each clamping arm is recessed on its inner side as shown at 36 to receive an expansion spring 37 by which the clamping arms are normally spread at their outer ends and contracted at their inner ends.

The inner ends of the clamping arms carry bosses 38 which ride over the cone 29 compressing the spring 37 and contracting the rear ends of the arms.

Toward the end of the spreading movement, the bosses 38 pass over the cone 29 and travel axially of the bar over the cylindrical extension 28.

At this point, the outer corner projections 39 on the arms 35 abut against the outer surface of the work piece 11.

The outer end of the yoke 32 is provided with a disk 40 which has a bevelled edge. This bevelled edge forms an abutment against which the rear ends of the clamping arms 35 come to rest when the front end engages the work piece.

At right angles to the plane of the clamping arms 35, 35 the fixture body 26 is provided with an extension 41. A transverse pivot 42 in this extension carries a hold-down lever 43. This lever has a lateral extension 44 at the front. The fixture body has a recessed expansion spring 45 resting against the inner side of the hold-down lever 43. The rear end 46 of the hold-down lever is formed with an incline 47.

In the same plane with the hold-down lever 43, the yoke carries a pin 48 which is adapted to travel along the rear end 46 and over the incline 47. When the bar 30 is extended outwardly, this pin moving on the incline 47 retracts the lateral extension 44 compressing the spring 45.

When, however, the bar 30 is drawn inwardly of the drum, the yoke and the pin 48 advance downwardly over the incline 47 and permit the spring 45 to bring the extension 44 against the inner surface of the work piece 11 with sufficient pressure to hold the work piece firmly against the bosses 27, 27. This hold-down step is carried out immediately before the clamping arms tighten over the edge surface of the work piece.

The opposite or inner end of the bar 30 is received within the chamber 49 of a sleeve 50. At its inner end the bar 30 has an enlargement 51 slidably moving in the chamber. The sleeve 50 is slotted as at 52 to receive a transverse pin 53 extending through the enlargement 51. The front end of the sleeve 50, at its outer end surrounds the inner end of a collar 55 and there abuts a nut 54 adjustably screw threaded on the collar 55. A coil spring 57 surrounds the inner end of the bar 30 and presses against the end of the collar 55 and the enlargement 51 of the bar. This spring is of the order of 50 pounds pressure for light clamping.

A second coil spring 58 surrounds the bar 30 and abuts the outer end 56 of the nut 54. This coil spring 58 rests against the inner surface of the fixture plate 22 and the outer end of the nut 54. This spring is much stronger than spring 57. It is of the order of 200 pounds pressure and serves to transmit such pressure through the nut 54, sleeve 50, the transverse pin 53 and the bar 30. In this arrangement, the smaller spring 57 is overridden.

An actuating rod 59 is journalled in the web 20 in alignment with the bar 30 and the collar 50. This actuating rod is connected to the sleeve 50 by means of an adjusting link 60.

The inner end of the rod 59 carries a yoke 61 having transverse journals 62 carrying a cam roller 63.

Permanently mounted opposite the end of the shaft 17, Fig. 4, is a shell 64 having a flange 65 in the plane of the individual work units. This flange carries a series of cams which are adjustable. As shown more particularly in Figure 3, there is a horizontally disposed cam 66 of maximum height. This cam is followed by a low area 67. At the left of the area 67 there is a slight rise or incline 68 to a land 69 of intermediate height.

This is followed in counterclockwise direction by a second low area 70 and finally by a steep rise 71 to a high cam 72.

The space between the cam 72 and the initial cam 66 is a third low area.

The operation of the cams is as follows. Assuming the drum to rotate counterclockwise as shown in Figure 3, the cam rollers 63 travelling over the cam 66 produce the maximum radial movement of the bar 30 so that the clamping arms and the hold-down lever are completely withdrawn. At this point, the work piece is placed in position on the fixture plate and adjusted with the notch fitting the locator.

As the drum rotates counterclockwise, the hold-down lever first draws the work piece against the bosses 27 after which the clamping arms are brought down with maximum pressure delivered directly from the heavier spring 58.

After passage through the area of the first pair of grinding disks 13, the cam rollers ride up the shoulder 68. This causes the collar to compress the spring 58 and take its pressure off the transverse pin 53 since the collar 50 moves forward extending slot 52 relative to the pin 53 in the direction indicated in Fig. 7. In any intermediate position the tension of spring 57 is exerted on the enlargement 51 and through the bar 30 to maintain a lesser holding effect on the workpiece.

At this point, the clamping arms are still held down by the pressure of the smaller coil spring 57.

This condition lasts through the second or finish grinding passage between the opposed grinding disks 14, 14.

The work holding units ultimately pass over the rise 71 and the high cam 72. Here, both coil springs are compressed, and the hold-down lever and clamping arms fully retracted. Since the work holding unit in this position is extended downwardly the completed work piece will fall out of position and the work unit is thus emptied. Further rotation will bring it opposite the horizontally disposed cam 66 when it will be ready to receive and hold another work piece.

The sliding movement of the nut 54 relative to the bar 30 is permitted by a transverse pin 73 in the bar 30 moving within a longitudinal slot 74 in the sleeve 54.

From the above disclosure, it will be readily apparent that the machine thus disclosed provides for receiving a rough work piece, placing it in the required position with definite holding pressure, followed by firm clamping with maximum pressure before it is presented between the rough grinding disks. This operation is followed by a relaxation of the grip on the work piece so that stresses are removed. The work piece is thereupon held with diminished pressure during its passage through the second or subsequent grinding step.

Finally, the finished work is completely released from the holding pressure and drops out of the machine, leaving the work holding unit available for the receipt of another rough work piece and a repetition of the above grinding cycle.

While the preferred form of the invention has been illustrated by way of example, numerous changes may be made in proportions and equivalent elements without departing from the scope of the invention as defined in the following claims.

What is claimed is:

1. A machine for carrying work pieces past a plurality of work stations comprising a rotary carrier having a series of work-holding units, each unit having positioning means for the work piece, hold-down means, work-clamping means, a slidable bar in the carrier to actuate said several means, lesser resilient means on the bar for actuating the clamping means, greater resilient means on the carrier for independently actuating the clamping means, a cam roller on the bar and fixed cams for successive engagement by the roller to maintain selective pressures on the work clamping means at the several work stations.

2. A machine for carrying work pieces past a plurality of work stations comprising a rotary carrier having a series of work-holding units, each unit having a fixture plate, circumferentially spaced work engaging stops thereon, a radially movable hold-down lever on the plate to draw the work piece into engagement with the stops, work clamping means, a slidable bar in the carrier for supporting the clamping means, separate resilient means related to the bar for actuating the clamping means, a cam roller on the bar and fixed cams for successive engagement by the roller to vary the pressure on the work clamping means at the several work stations.

3. A machine for carrying work pieces past a plurality of work stations comprising a rotary carrier having a series of work holding units, each unit having a fixture plate, circumferentially spaced work engaging stops thereon, a central cone on the plate, a bar slidable through the cone, a hold-down lever on the plate to draw the work piece into engagement with the stops, work clamps pivoted on the bar, separate resilient means related to the bar for actuating the clamps, a cam roller on the bar, fixed cams axially positioned relative to the carrier to vary the pressure of the resilient means on the work clamps.

4. A machine for carrying work pieces past a plurality of work stations comprising a rotary carrier comprising a rotary drum and a concentric web, said carrier having a series of work holding units, each unit having a fixture plate, circumferentially spaced work engaging stops thereon, a central cone on the plate, a bar slidable through the cone and carrier, a hold-down lever on the plate to draw the work-piece into engagement with the stops, work clamps pivoted on the bar, an enlarged inner end on the bar, a sleeve slidable on and loosely engaging the bar, a spring between the sleeve and said inner end, a collar slidably engaging the inner end of the bar and enclosing the spring and the sleeve, a second spring between the collar and the drum, a fixed cam track centrally of the carrier and an extension between the collar and the cam track.

5. A machine for carrying work pieces past a plurality of work stations comprising a rotary carrier comprising a rotary drum and a concentric web, said carrier having a series of work holding units, each unit having a fixture plate, circumferentially spaced work-engaging stops thereon, a central cone on the plate, a bar slidable through the cone and carrier, a hold-down lever on the plate to draw the work piece into engagement with the stops, work clamps pivoted on the bar, spring means for drawing the bar inwardly, a collar loosely connected to the bar, second spring means for drawing the collar and bar inwardly, an extension on the bar, and a plurality of cams fixedly and centrally mounted opposite the said extension to alter the clamping pressure at each station for loading, working and unloading.

6. A machine for carrying work pieces past a plurality of circularly disposed work stations comprising a rotary carrier having a series of radially arranged work holding units, each unit having positioning means for the work piece, means to hold down the work piece and means to clamp the work piece, a radially slidable bar in the carrier to actuate said several means, separate resilient means for actuating the clamping means, a cam roller on the inner end of the unit and fixed centrally located cams for successive engagement by the roller to maintain selective degrees of pressure from said resilient means on the work clamping means at the several work stations and when loading and unloading.

7. A machine for carrying work pieces past a plurality of work stations comprising a rotary carrier having a series of radially arranged work holding units, each unit having positioning means for the work piece, and a pivoted hold-down means on each unit, a slidable bar radially journalled in the carrier, a yoke pivoted centrally on the outer end of the bar, clamping means journalled on opposite sides of the yoke, means on the unit for bringing the clamping means into engagement with the work piece with equalized pressure, separate spring means for applying selective pressures on the bar, a central extension of the bar and cam means for actuating the said extension to preselected extent.

8. In a disc grinder having angularly disposed grinding zones for successive rough and finish grinding, each zone having a pair of opposed abrasive discs, a workholding carrier movable continuously through said grinding zones, work clamping means on the carrier, dual pressure means on said carrier for said clamping means, and means responsive to the rotation of the carrier to reduce the pressure from one of said pressure means on the clamping means as the carrier moves from a rough grinding zone to a finish grinding zone.

9. In a grinder with opposed discs, a carrier for moving workpieces relative to said discs for operative engagement therewith, work clamping means on said carrier, a heavy spring applying a high pressure on said clamping means to hold a workpiece rigidly during a rough grinding operation, a light spring applying a lesser pressure on said workpieces during a finish grinding operation, means responsive to movement of said carrier for relaxing the pressure of said heavy spring from said clamping means while said light spring exerts a lower pressure on said workpieces.

10. In a disc grinder having angularly disposed grinding zones for successive rough and finish grinding, each zone having a pair of opposed abrasive discs, a workholding carrier movable continuously through said grinding zones, work clamps on the carrier, actuating means for applying a high or low clamping force to each clamp, and fixed cam means operating said clamp actuating means to change the force applied to said clamp as the carrier moves from one grinding zone to another grinding zone and to maintain a predetermined clamping force on a workpiece as it moves through each grinding zone.

References Cited in the file of this patent

UNITED STATES PATENTS

| 1,482,272 | Smith | Jan. 29, 1924 |
| 1,578,966 | Edelmann | Mar. 30, 1926 |
| 1,947,957 | Tillman | Feb. 20, 1934 |

FOREIGN PATENTS

| 497,873 | Great Britain | Dec. 30, 1938 |